Figure 1:
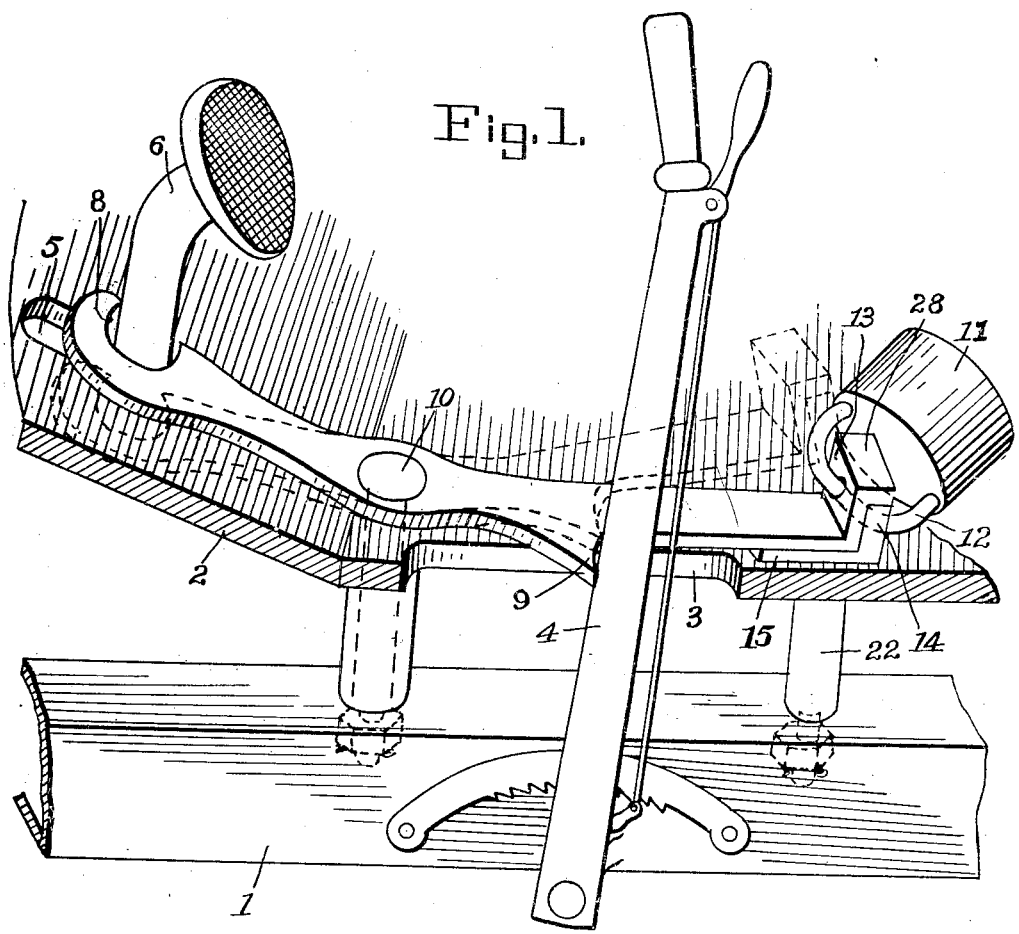

L. BALESTRINO AND G. MERIGONE.
MULTIPLE LEVER LOCK FOR AUTOMOBILES.
APPLICATION FILED OCT. 14, 1919.

1,348,840.

Patented Aug. 10, 1920.

INVENTORS:
Louis Balestrino
and Giacinto Merigone,
By Frederick V. Winters
Attorney

UNITED STATES PATENT OFFICE.

LOUIS BALESTRINO, OF BROOKLYN, AND GIACINTO MERIGONE, OF NEW YORK, N. Y.

MULTIPLE-LEVER LOCK FOR AUTOMOBILES.

1,348,840.  Specification of Letters Patent.  Patented Aug. 10, 1920.

Application filed October 14, 1919. Serial No. 330,585.

*To all whom it may concern:*

Be it known that we, LOUIS BALESTRINO and GIACINTO MERIGONE, subjects of the King of Italy, and residents of Brooklyn, in the county of Kings and State of New York, and New York, in the county and State of New York, respectively, have invented certain new and useful Improvements in Multiple-Lever Locks for Automobiles, of which the following is a full, clear, and exact specification.

This invention relates to locks for preventing the unauthorized use of automobiles, and has for its object to provide a simple device which may be attached to an automobile, especially a Ford car, at slight trouble and expense, and which will secure the emergency brake lever and clutch pedal of such cars against being released as is necessary before the machine can be started. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 2:
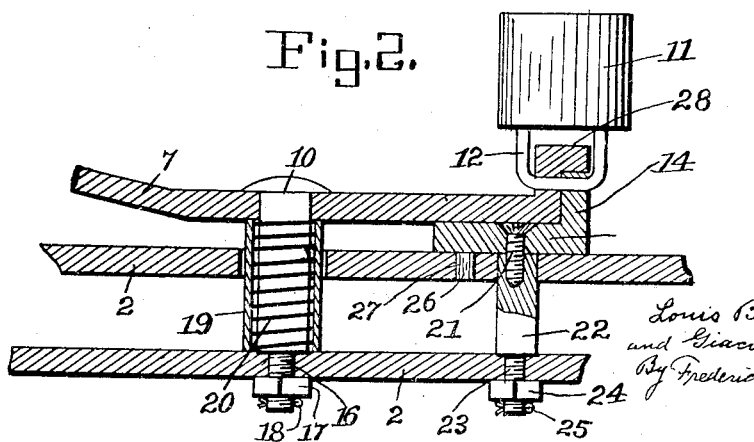

Figure 1 is a perspective view of a portion of the floor, one frame rail, emergency brake lever and clutch pedal of a Ford car, showing our locking device applied thereto, the same being indicated in solid lines in locked position and in dotted lines in unlocked position, and Fig. 2 is a section taken vertically through the pivot point of the locking member and the bracket to which it is secured.

In the drawings, 1 designates one of the frame rails of a Ford car, and 2 the floor. Said floor has a slot 3 through which the emergency brake lever 4 extends, and another slot 5 through which the clutch pedal 6 extends, the other Ford pedals not being shown. The locking member 7 has a notch 8 near its forward end to engage the pedal 6 and hold it in neutral position, and a tooth or projection 9 near its other end to engage the front edge of the lever 4 when the latter is drawn back to the usual position for applying the emergency brake.

Said locking member 7 is pivoted intermediate of its ends by a bolt 10, and the notch 8 and tooth 9 are on opposite edges of said member so that they may be simultaneously brought into engagement with the pedal and lever when the member is swung one way on its pivot, as illustrated in solid lines in Fig. 1, and simultaneously release said pedal and lever when swung the other way as indicated in dotted lines in the same figure. When in locking position said member 7 may be fastened by means of a padlock 11 having its shackle 12 passed through registering openings in the upturned end portion 13 of the member and the upturned portion 14 of a bracket 15.

The pivot bolt 10 for the locking member extends down through the floor 2 and is fastened to the horizontal upper flange of the rail 1, the lower end portion of said bolt being reduced as at 16 to pass through said flange and having a nut 17 and cotter pin 18 for holding it. The member 7 is supported upon a tube 19 mounted concentrically around the bolt 10 and extending from the upper flange of the rail 1 up through the floor 2 as shown in Fig. 2. A coiled spring 20 is arranged between the bolt and tube for pressing the member 7 upward against the head of the bolt and preventing rattling as well as retaining said member in unlocked position.

The bracket 15 is also secured to the upper flange of the rail 1 by means of a screw 21 extending through the bracket and into a socket in the upper end of a stud 22 which has a reduced lower end 23 passed through said rail 1 and fastened by a nut 24 and cotter pin 25, Fig. 2, said stud extending up from said rail through the floor 2 so as to support the bracket flush with the upper surface thereof. To prevent the bracket from being rotated on the screw 21, a depending lug 26 may be formed on the bracket to engage a corresponding hole 27 in the floor. It will be noted that when the member 7 is in locking position, it covers the screw 15 so that the latter cannot be removed. The upturned end portion 13 of said locking member may have a horizontal extremity 28 to overlap the upturned portion 14 of the bracket when the parts are in locked position so as to prevent a tool from being driven down between the end of the locking member and the bracket.

Having thus described our invention, what we claim as new and desire to secure by Letters Patent of the United States is:—

1. The combination with the floor and an under frame rail of an automobile, of a bolt secured to said rail and extending up through the floor, a control lever locking member pivoted on said bolt, a tube mounted around said bolt and also extending up through the floor to support said member above the upper surface thereof and means for securing said member in locking position.

2. The combination with the floor and an under frame rail of an automobile, of a control lever locking member, a bolt secured to said rail and extending up through the floor to serve as a pivot for said member, said bolt having a bead arranged above said member, a tube mounted around said bolt and also extending through the floor to support said member above the upper surface of the floor, and a coiled spring around the bolt to press said member upward against the head of the bolt for preventing the locking member from being jarred out of adjusted position.

3. The combination with the floor and an under frame rail of an automobile, of a control lever locking member pivoted to swing above said floor, a bracket, means for securing said member to said bracket when the former is in position to lock the control lever, a stud secured to the rail and extending up through the floor, and a screw passed through the bracket to engage said stud, whereby said bracket is supported from the rail, and a lug depending from the bracket and engaging a hole in the floor to prevent said bracket from rotation.

In testimony whereof we have signed our names to this specification.

LOUIS BALESTRINO.
GIACINTO MERIGONE